US007400588B2

(12) United States Patent
Izzat et al.

(10) Patent No.: US 7,400,588 B2
(45) Date of Patent: Jul. 15, 2008

(54) DYNAMIC RATE ADAPTATION USING NEURAL NETWORKS FOR TRANSMITTING VIDEO DATA

(75) Inventors: Izzat Hekmat Izzat, Carmel, IN (US); Mary Lafuze Comer, Fairmount, IN (US); Yousef Wasef Nijim, Carmel, IN (US)

(73) Assignee: Thomson Licensing, Boulogne Billancourt (FR)

( * ) Notice: Subject to any disclaimer, the term of this patent is extended or adjusted under 35 U.S.C. 154(b) by 760 days.

(21) Appl. No.: 10/632,765

(22) Filed: Aug. 1, 2003

(65) Prior Publication Data

US 2005/0025053 A1     Feb. 3, 2005

(51) Int. Cl.
*H04J 1/16*     (2006.01)
*H04J 3/16*     (2006.01)
(52) U.S. Cl. ........................................ 370/252; 370/465
(58) Field of Classification Search ........................ None
See application file for complete search history.

(56) References Cited

U.S. PATENT DOCUMENTS

| 5,398,302 | A | 3/1995 | Thrift | 395/23 |
|---|---|---|---|---|
| 6,018,729 | A | 1/2000 | Zacharia et al. | 706/21 |
| 6,055,270 | A | 4/2000 | Ozkan et al. | 375/240 |
| 6,252,905 | B1 * | 6/2001 | Pokrinchak et al. | 375/240.14 |
| 6,289,054 | B1 * | 9/2001 | Rhee | 375/240.27 |
| 7,058,048 | B2 * | 6/2006 | Clark | 370/356 |
| 2004/0148423 | A1 * | 7/2004 | Key et al. | 709/235 |
| 2007/0140128 | A1 * | 6/2007 | Klinker et al. | 370/238 |

OTHER PUBLICATIONS

Shanwei Cen, Calton Pu and Jonathan Walpole, "Flow and Congestion Control for Internet Media Streaming Applications" pp. 1-14.
Jonathan Walpole, et al. "A Player for Adaptive MPEG Video Streaming Over the Internet".
Steven McCanne, Van Jacobson and Martin Vetterli "Receiver-Driven Layered Multicast", pp. 117-130.
C. Zhu, Sep. 1997, Network Working Group, RFC2190 "*RTP Payload Format for H.263 Video Streams*", 9 pages.
Dave Anderson and George McNeill, Aug. 20, 1992, "*Artificial Neural Networks Technology*", pp. 1-83.

* cited by examiner

*Primary Examiner*—Andrew Lee
(74) *Attorney, Agent, or Firm*—Joseph J. Laks; Harvey D. Fried; Joel M. Fogelson

(57) ABSTRACT

An adaptative source rate control method and apparatus utilizing a neural network are presented for controlling a data transmission of a media object over a communication network. A back propagation method transmitting control parameters related to the operation of a communications network is used for to dynamically adjust the performance of the network, in view of network parameters being sourced to a point of transmission. The bit rate and quantization level of the data stream are dynamically adjusted and shaped by the neural network in response to control parameters.

4 Claims, 3 Drawing Sheets

DYNAMIC RATE ADAPTATION USING NEURAL NETWORKS FOR TRANSMITTING VIDEO DATA

FIELD OF THE INVENTION

This invention is related to the field of encoding video based transmissions utilizing artificial intelligence techniques.

BACKGROUND OF INVENTION

With the development of communications networks such as the Internet and the wide acceptance of broadband connections, there is a demand by consumers for video and audio services (for example, television programs, movies, video conferencing, radio programming) that can be selected and delivered on demand through a communication network. Video services, referred to as media objects or streaming audio/video, often suffer from quality issues due to the bandwidth constraints and the bursty nature of communications networks generally used for streaming media delivery. The design of a streaming media delivery system therefore must consider codecs (encoder/decoder programs) used for delivering media objects, quality of service (QoS) issues in presenting delivered media objects, and the transport of information over communications networks used to deliver media objects as audio and video data as a signal.

Codecs are typically implemented through a combination of software and hardware as a system used for encoding data representing a media object at a transmission end of a communications network and for decoding data at a receiver end of the communications network. Design considerations for codecs include such issues and as bandwidth scalability over a network, computational complexity of encoding/decoding data, resilience to network losses (loss of data), and encoder/decoder latencies for transmitting data representing media streams. Commonly used codecs utilizing both Discrete Cosine Transformation (DCT) (e.g., H.263+) and non-DCT techniques (e.g., wavelets and fractals) are examples of codecs that consider these above detailed issues. Codecs are used to compress and decompress data because of the limited bandwidth available through a communications network.

Quality of service issues relate to the delivery of information and the overall experience for a user watching a media stream. Media objects are delivered through a communications network, such as the Internet, in discrete units known as packets. These units of information, typically transmitted in a sequential order, are sent via the Internet through nodes commonly known as servers and routers. It is therefore possible that two sequentially transmitted packets arrive at a destination device at different times because the packets may take different paths through the Internet. Consequentially, a QoS problem known as dispersion could result where a packet transmitted later in time may be processed and displayed by a destination device before an earlier transmitted packet, leading to discontinuity of displayed events. Similarly, it is possible for packets to be lost when being transmitted. A destination device typically performs an error concealment technique to hide the loss of data. Methods of ensuring QoS over a network as over-allocating the number of transmitted packets or improving quality of a network under a load state may be used, but these methods introduce additional overhead requirements affecting communication network performance.

Communication networks control the transfer of data packets by the use of a schema known as a transport protocol. Transmission Control Protocol (TCP) described in Internet Engineering Task Force (IETF) RFC 793 is a well-known transport protocol that controls the flow of information throughout a communications network by maintaining parameters as flow control, error control, and the time organized delivery of data packets. These types of controls are administered through the use of commands that may either exist in a header of a packet or separate from packets that are transmitted between devices through the communications network, relaying information about the status of network communications. This control information works well for a communications network that operates in a "synchronous" manner where the transmission of data packets for media objects tends to be orderly.

Other types of media objects, in the form of streamed data, tend to be delivered or generated asynchronous by where the flow of packets may not be consistent. These packets are transmitted and received at different times, hence asynchronously, in where received packets are reconstituted in view of data present in the headers of such packets. The transmission of asynchronous packets suffers when network conditions drastically reduce the transmission (or receipt) of packets, resulting in network loss of service, degradation, or requiring a transmission to time out that cancels a transmission.

Flow control methods are already known in the art, using network control messages such as Real Time Control Protocol (RTCP), Internet Control Message Protocol (ICMP), Simple Network Management Protocol (SNMP), and the like, which can adjust and control the bit rate transmission of packets over a communications network. A transmitter receives feedback about current network conditions (as network communications parameters) and modifies the transmission bit rate in response. The transmission bit rate of packets is increased if network conditions are not congested, which improves the quality of a transmission. The bit rate of a transmission is similarly decreased, if network congestion is high, degrading the transmission of packets.

Flow control methods are typically limited to the consideration of relatively few variables. The ability of a network to adjust to these reported network conditions is limited to a non-realistic mathematical model, which does not take into account the asynchronous nature of a packet-based network. The transmission of packets comprising a media object, transmitted as streamed data, would benefit from a system adapting to network conditions providing better QoS than fixed subroutines.

SUMMARY OF THE INVENTION

In accordance with the principles of the present invention, a method and an apparatus for transmitting a media object as an encoded signal is presented. The media object is encoded into a signal by using a neural network that controls such encoding in response to the status of a communications network. The status of the communications network is transmitted to the neural network in the form of network communication parameters. The encoding of the media object is adaptively adjusted by the neural network shaping the bit rate and changing the quantization level of an encoder in response to such received network communication parameters.

DETAILED DESCRIPTION OF THE PREFERRED EMBODIMENT

Figure 1:
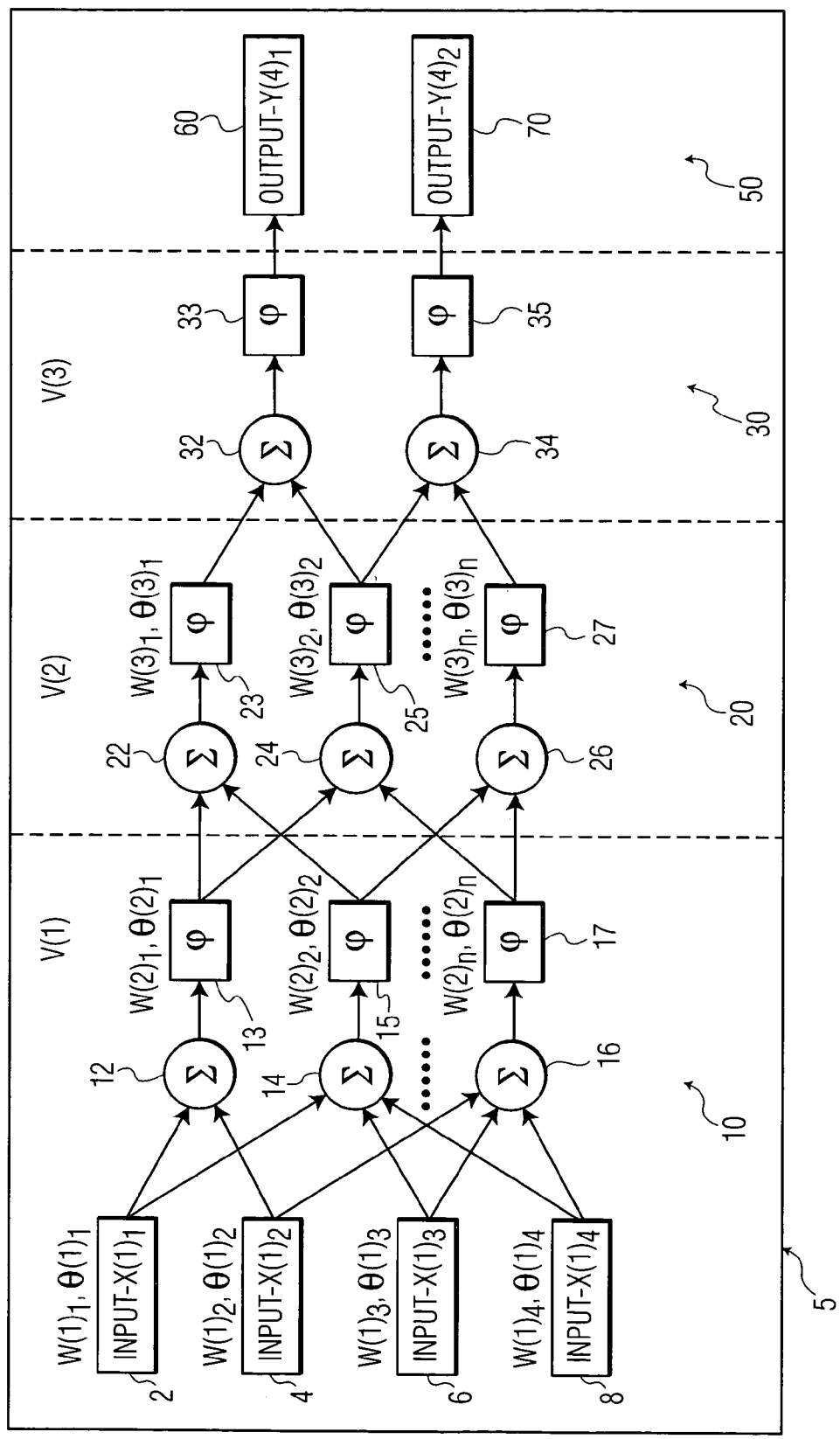
FIG. 1 is a diagram of an exemplary technique for the training of a neural network in accordance with an embodiment of the present invention.

In FIG. 1, a technique for training a neural network is shown. Typically, a neural network is a mathematical model, implemented in a computer program as SIMULINK™ or MATHLAB™ that models a system based upon various inputs that after a certain number of layers leads to an output. A change in the input, therefore affects the output using the different nodes and layers present in a neural network.

Neural networks are used when attempting to model a system without having knowledge of all of the variables and equations representing how a system works. The neural network benefits from the ability of being able to be trained. This training proceeds with specific values being used as input values for the neural network. The neural network is then "taught" to give specific output values corresponding to the specific input values. Once this process is repeated a number of times with other "known" input values and output values, a set of input values is fed into the neural network. The neural network will return a set of output values, which should correlate to the expected output values for the set of input values.

If the neural network does not return an expected set of output values, parameters of the neural network are then adjusted, and the training process begins again. The training of a neural network typically ends when the neural network is capable of returning expected values of outputs corresponding to a set of input values.

One specific technique for training a neural network is called back propagation where the neural network is modeled with an assumption that a control system operates non-linearly. Hence, the system may not be modeled as a set of linear equations. Typically, such networks comprise a number of layers. Input layer 10 represents the inputs into a neural network system, and correspondingly output layer 50 represents the output of the neural network system. Hidden layer 20 is fed inputs from the input layer and "maps" the relationship between the inputs and the outputs. The more hidden layers 20 to a system, the more complex the relationship that can be mapped between the input layer 10 to output layer 50.

At input layer 10, input values are fed into a "neuron", each neuron representing different network control parameter. These input values are represented as $X(L)_n$ (L=layer number, n=1 to m, m=the number of total inputs). For example, in input layer 10, the corresponding inputs are known as $X(1)_n$ because input layer 10 represents the first layer of neural network 5. After receiving the input values, the values are summed by summation blocks 12, 14, 16 and the outputted to function blocks 13, 15, and 17. It is noted, that the presented summation and weighting blocks are an exemplary sample of the blocks used for a neural network. Other summation and weighting blocks may be used for the operation of a neural network.

Function blocks 13, 15, 17 as use $W(L)_{nc}$ (c=number of iterations run for the neural network) as a weighting factor that is adjusted for each for $X(L)_n$ depending upon the performance of the output at output layer 50, and $\theta(L)_n$ presents the threshold value of a neuron, or the maximum value that a neuron may take. V(L) is the net internal activity level of an neuron, and $Y(L)_n$ is the transfer function used at a specific layer of a neural network.

The inputs from input 10 of the neural network are fed into a function block (as function block 13 via summation block 12). The composition of a summation block with a function block may also be identified as a node. The node computes an output function based on the mathematical relationship of the defined function of the function block. The transfer function may be linear or nonlinear. In the present case, the nonlinear sigmoid function is listed, in Table 1 and is applied to nodes (see FIG. 1) with a defined as the slope of the sigmoid function:

TABLE 1

$$\varphi(v) = \frac{1}{1 + \exp(-av)}$$

A method for adapting the weights $W(L)_n$ of the network is known as error back-propagation. A learning algorithm based on the gradient descent algorithm, known in the art, supervises neural network 5 for the implementation of error back propagation. This algorithm minimizes the error between the actual network output and the desired output for optimal system performance.

In an exemplary embodiment of the invention, the use of the gradient descent algorithm begins with a network configuration where $W(1)_n$ and $\theta(1)_n$ are set as small random numbers that are uniformly distributed. A first training set of inputs are calculated where a forward and a back pass is performed between input layer 10, hidden layers 20, 30, and output layer 50. A forward pass is calculated by denoting two vectors, $X(1)_{1\ to\ n}$ representing all the values at the input layer 10 and $D(i)_m$ representing all the desired output values at output layer 50. The computation of the forward pass utilizes the formula in Table II, $Y(L-1)_n$ is the function signal of a neuron in the previous layer for an iteration c:

TABLE 2

$$V(L) = \sum_{n=1}^{p} W(L)nc Y(L-1)n$$

At the output layer 50, an output function is calculated as $O(i)_m = Y(i)_m$, representing an output vector. An error vector is also calculated, where the output values are subtracted from the desired output values $D(i)_m$, yielding the error value in $E(i)_m = D(i)_{m-O(i)m}$.

A backward computation is calculated by using the error calculated by using the results of the forward computation as to calculate a new value $\delta(L)_n$ where the two formulas in Table 3 are used, and which are dependent upon the layer of the neural network.

TABLE 3

| | |
|---|---|
| $\delta(L)_n = E(i)_m O(i)_m [1 - O(i)_m]$ | for neuron in the output layer m |
| $\delta(L)_n = Y(L)_n [1 - Y(L)_n] \Sigma \delta(L+1)_n W(L+1)_n$ | for neuron in a hidden layer |

A new value is then calculated for the weighting values $W(L)_{nc}$ in accordance with the formula shown in Table 4, using the values calculated from the forward and back computation techniques, where η is the learning rate parameter and α is the momentum constant.

TABLE 4

$$W(L+1)_{nc} = W(L)_{nc} + \alpha[W(L)_{nc} - W(L-1)_{nc}] + \eta\delta(L)_n Y(L-1)_n$$

For the instant embodiment of the present invention, a training set was created with four inputs at input layer 10 (normalized between 0, 1) and two outputs at output layer 50. First hidden layer 20 uses seven nodes and second hidden layer 30 has four nodes. Some of the nodes of the first hidden layer are shown as summation blocks 22, 24, and 26 with function blocks 23, 25, and 27. Likewise, the nodes of second hidden layer 30 are shown as summation blocks 32, 34 and function blocks 33, 35.

Corresponding to the output layer 50, output 60 represents the rate shaper buffer (used to control the bit rate of an encoder, using values −10 to 10) and a second output 70 represents information for controlling the quanitization level (1, −1) of the encoder. Network communication parameters from RTCP sender reports generated about network conditions during an RTP based transmission represent the input values for input layer 10. Input 2 is the packet fraction loss, input 4 is the cumulative number of packets lost, input 6 represents the inter arrival jitter of network communicated packets, and input 8 is the last sender report. These network communication parameters are not limited to the parameters described above. Other network communication parameters may be selected depending on the transmission protocol used and parameters available describing network conditions.

After running the training set for a number of iterations using known values of network communication parameters and their corresponding known output values, the neural network is tested. If the neural network provides expected output values, for known values of inputted network communications parameters, it is deemed that neural network is trained.

The neural network is implemented as a software algorithm for a controller used to operate an encoder for a real time or close to real time encoding operation. Programming code representing the neural network is generated by exporting the neural network as computer code capable of being run on a controller.

Figure 2:
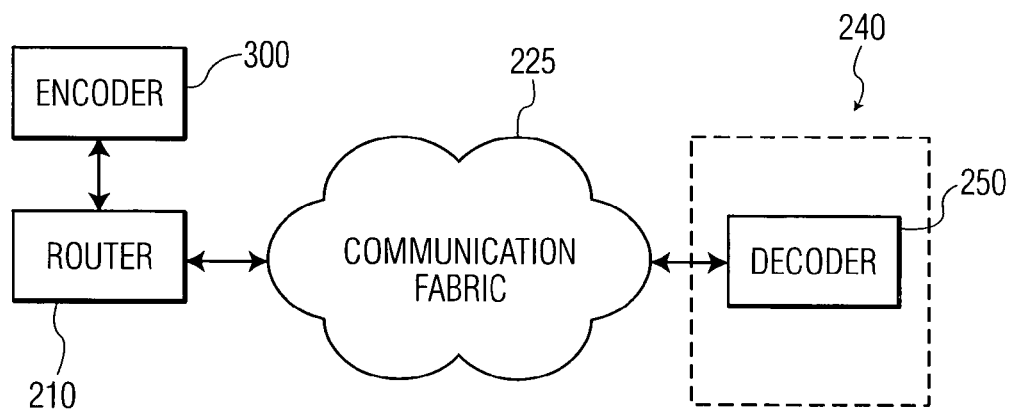
FIG. 2 is a system diagram of an exemplary communications network using an embodiment of the present invention.

FIG. 2 is a system diagram of communications network in which an embodiment of the present invention may be used. Encoder 300 encodes video data in accordance with a video image compression standard or scheme such as MPEG-2. The MPEG2 (Moving Pictures Expert Group) image encoding standard, hereinafter referred to as the "MPEG standard" is comprised of a system encoding section (ISO/IEC 13818-1, 10th Jun. 1994) and a video encoding section (ISO/IEC 13818-2, 20th Jan. 1995), hereinafter referred to as—the "MPEG systems standard" and "MPEG video standard" respectively.

Although the disclosed system is described in the context of a system for transmitting and receiving an MPEG compatible signal, it is exemplary only. The principles of the invention may be applied to systems in which the types of transmission channels and communication protocols may vary, or to systems in which the coding type may vary such as non-MPEG systems, involving other types of encoded datastreams and other methods of encoded video data.

Encoder system 300 transmits the encoded MPEG-2 data to decoder 250 (in decoder system 240) using a transport protocol via RTP with control messages being transmitted using RTCP reports. Control messages are transmitted back to encoder system 300 with information related to network performance and data informing the encoder about the flow control and the data loss rate. For the instant embodiment of the invention, the network communication parameters are entered into inputs 2-8 of the input layer.

The encoded video data is transmitted via communication fabric 225, such as the Internet, an Ethernet network, T1, T3 or other type communications network capable of transmitting encoded video data. The data transmitted over the communications fabric 225 is preferably transmitted as packetized data.

As an alternative source for network communication parameters, router 210 that couples encoder system 300 to decoder system 240 via the communications interface, reports back network communication parameters about the current status of the network to encoder system 300. These network communication parameters are fed back into the inputs 2-8 of the input.

Figure 3:
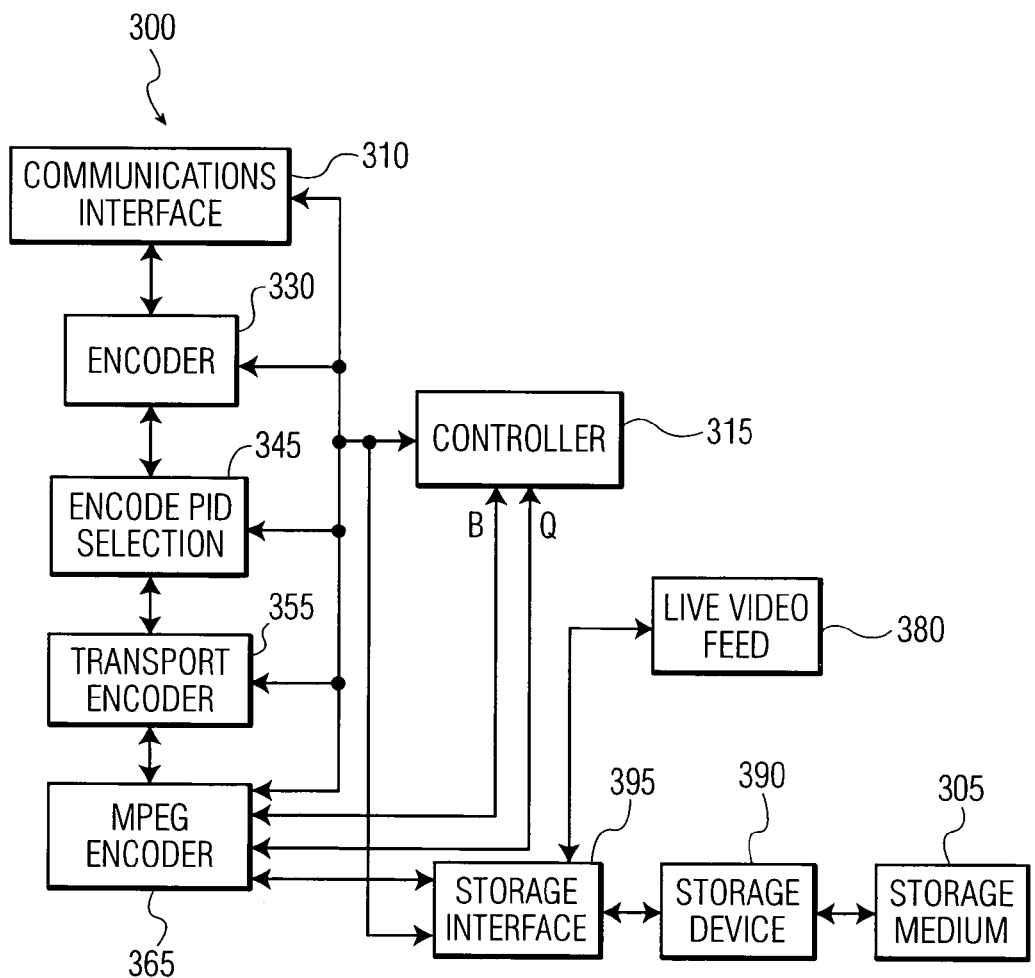
FIG. 3 is a system diagram an exemplary encoding system in accordance with an embodiment of the present invention.

FIG. 3 is a diagram of an embodiment of encoder system 300. System 300 receives video signals data from a source such as storage device 390, storage medium 305, or a live feed video source 380. Storage device 390 is a medium for storing video such as a hard disc drive, CD-Rom drive, DVD-drive, or any other type of device capable of storing a high quantity of video data. Storage medium 305 is capable of being accessed via a storage device 390, such storage mediums being discs, CD-Roms, DVDs, tapes, and other types of storage mediums able to store video data. Live feed video source 380 provides a video signal from a "live source" such as a television broadcast source, satellite, antenna, or a device, as a video camera, may be appreciable used as a source of video data. Storage interface 395 coordinates the delivery of video data from video sources to MPEG encoder 365 via controller 315.

Controller 315 controls the functions of individual elements within encoder system 300 by setting control register values used to operate the other components of the system. These values are especially important for controlling the operation of MPEG encoder 365, which is used to encode the video data available from a video data source. In such, the neural network, as explained above, is coded as a control system into controller 315 to operate encoding of video data from a video source to MPEG encoder 365 via storage interface 315. Controller 315 receives information about network conditions of communications fabric 390 via the RTCP messages (inputs 2-8), which results in controller 315 adjusting the bit rate and quanitization level of the video encoding done by MPEG encoder 365.

Figure 4:
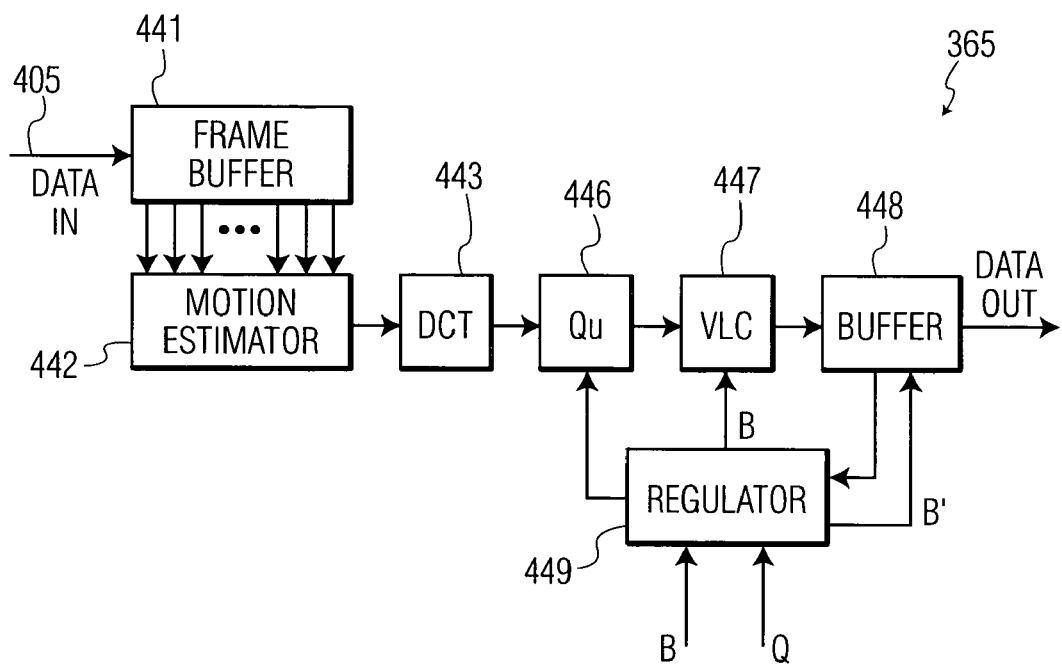
FIG. 4 is a system diagram of an exemplary MPEG encoder operating with control information from a neural network in accordance with an embodiment of the present invention.

FIG. 4 shows an expanded view of MPEG encoder 365, in accordance with an embodiment of the present invention. Data input terminal 405 (DATA IN) of MPEG encoder 365 is coupled to storage interface 395 that enable video data from a video source to be compressed and encoded. Data input terminal 405 is coupled to an input terminal of a frame buffer 441. Frame buffer 441 includes a plurality of frame period buffers or delay lines and a plurality of output terminals producing respective signals representing portions of different, but temporally adjacent, frames or pictures. The plurality of output terminals of the frame buffer 441 are coupled to corresponding input terminals of a motion estimator 442. An output terminal of motion estimator 442 is coupled to a discrete cosine transform (DCT) circuit 443. An output terminal of DCT circuit 443 is coupled to a data input terminal of a variable quantizer (Qu) circuit 446. An output terminal of variable quantizer circuit 446 is coupled to an input terminal of a variable length coder (VLC) 447. An output terminal of VLC 447 is coupled to an input terminal of an output buffer 448. A data output terminal of output buffer 48 is coupled to a data output terminal (DATA OUT) of MPEG encoder 365.

Data output terminal (DATA OUT) of MPEG encoder 365 is coupled to a corresponding input terminal of transport encoder 355 (of FIG. 3).

A status output terminal of output buffer 448 is coupled to a status input terminal of encoding regulator 449. A control output terminal of encoding regulator 449 is coupled to a control input terminal of variable quantizer 446. A quantizer level terminal Q of MPEG encoder 365 is coupled to a corresponding quanitizer controller terminal of controller 315. The quantizer terminal Q of the MPEG encoder 365 is coupled to a control input terminal of encoding regulator 449.

A control output terminal of the encoding regulator 449 is also coupled to a control input terminal of VLC 447, as to specify a specific bit rate for VLC 447 to encode video data received from variable quantizer 446. A bit rate terminal B of MPEG encoder 365 is coupled to a corresponding bit rate controller terminal of controller 315. The bit rate terminal B of MPEG encoder 365 is also coupled to a control input terminal of encoding regulator 449.

In operation, MPEG encoder 365 operates in a known manner to compress and encode the video signal at its input terminal for a period at a bit rate as determined by a signal input terminal B and a quanitization level as determined by a signal at its Q input terminal. In the following example, an MPEG encoder 365 encodes a video signal partitioned into groups (GOPs) consisting of twelve pictures or frames is described. However, it should be understood that the number of pictures or frames in a GOP can vary. Also in the following example, it is assumed that the bit rate allocation and quanitization level for MPEG encoder 365 is updated once each GOP, i.e. the update period is the GOP period. However, it should also be understood that the updating of values may be adjusted depending upon other attributes as time, amount of data transmitted, network disruptions, packet loss, and other values related to network conditions.

The frame buffer 441 receives and stores data representing the portion of the twelve frames in the exemplary GOP currently being encoded necessary to perform motion estimation, in a manner described below. This data is supplied to motion estimator 442. In the preferred embodiment, the first one of the twelve frames or pictures is used as a reference frame (I frame), and is passed through the motion estimator to DCT circuit 443. For the remainder of the frames, a motion vector is generated in motion estimator 442 for each one of a plurality of 16 pixel by 16 line blocks in each picture or frame, termed macroblocks in the MPEG standard document, either from preceding frames alone (P frames), or interpolated from both preceding and succeeding frames (B frames). As described above, frame buffer 441 holds the data necessary for the motion estimator to perform the estimation from preceding frames or the interpolation from preceding and succeeding frames. The generated motion vectors for a particular frame are then compared to the actual data in the frame being estimated and a motion difference signal is generated, and supplied to DCT circuit 443.

In the DCT circuit 443, the 16 pixel by 16 line macroblocks of spatial data from the I frame and motion difference signals from the P frames and B frames are divided into six 8 pixel by 8 line blocks (four luminance blocks, and two subsampled chrominance blocks) termed microblocks in the remainder of this application, in accordance with the MPEG standard document. A discrete cosine transform is performed on each microblock. The resulting 8 by 8 blocks of DCT coefficients are then supplied to variable quantizer 46. The 8 by 8 blocks of coefficients are quantized, scanned in a zig-zag order and supplied to VLC 47. The quantized DCT coefficients, and other side information (related to parameters of the encoded GOP), representing the GOP are encoded using run length coding in the VLC 447, and supplied to output buffer 448.

The output bit rate of VLC 447 is controlled by the input signal from regulator 449 via terminal B, as to adjust or shape the bit rate for the MPEG encoder 365. Concurrently, the quantization levels (or, put another way, the quantizing step size) to be used for quantizing each block of DCT coefficients in variable quantizer 446 are adjusted via the input signal from regulator 449. Within an update period, which is the period between the update signals from controller 315 to (of FIG. 3), encoding regulator 49, in known manner, supplies a control signal to the variable quantizer 446 which varies the number of levels into which each 16 by 16 macroblock in the GOP is being quantized in order to maintain the allocated quanitization level for an update period. Typically, quanitization levels are changed, increments as 0, −1, or 1, although other step sizes may be selected. Likewise, the bit rate used by the VLC 447 is adjusted in a similar manner, according to the control system parameters developed by controller 315. The bit rate and quanitization levels as specified for encoder regulator 49 via controller 315, in the present example, are varied for each GOP period in response to the network transmission values as developed in the control system of controller 315.

In an alternative embodiment of the invention, the buffer 448 interfaces with regulator 449 to adjust the output of encoded video data as a function of bit rate. For example. VLC 447 would operate as a constant rate encoder, where only the quanizations levels of quantizer 446 are adjusted by an input signal from encoder regulator 449. Buffer 448 would "rate shape" the bit rate of the outputted encoded video data by increasing the bit rate of the encoded data if network conditions were favorable, and decreasing the bit rate of the encoded video data upon negative network conditions, as specified by the neural control system in controller 315. The modification would feature an input terminal into buffer 448 leading into an output terminal of regulator 449, as terminal B'.

Referring to FIG. 3, controller 315, in conjunction with transport processor 55, encodes an MPEG compatible datastreem of compressed video from MPEG encoder 365. Transport processor 355 encodes system information including timing, error and synchronization information into the MPEG compatible datastream for transport via PID encoder 345 that separates the MPEG data stream into packets identified by their individual PIDs. Controller 115 applies the system information in controlling transport processor 355 to provide synchronization and error indication information for use packetizing the MPEG compatible data stream.

The packetized MPEG compatiable data stream is encoded by encoder 300 for transmission over a communications fabric 390. In this embodiment of the invention, the MPEG compatible data stream is formatted into an MPEG data stream capable of being delivered via RTP over an RTP compatible communications network, as a communications fabric. The formatted data stream is then communicated from the encoder 330 to communications interface 310 connected for transmission over communications fabric 390.

As explained above, communications interface 310 receives data back from the communications fabric 390 about the status of the transmission. The data received, as communicated parameters (real time control packets, RTCP) as data packet fraction loss, cumulative number of packets lost, inter-arrival jitter, and sender report (?) are parameters that are considered to be parts of standard parameters used to report about network conditions. Other parameters may be selected as through using RTCP reported parameters, as known in the art. These parameters may be generated via a device or router located on the communications fabric 390 or by a receiving device that receives data from the communications interface 310 that reports network conditions back to the encoder.

These data parameters, when received by communications interface 310 are reported back to controller 315 to operate the neural network, in the manner as described above.

In an alternative embodiment of the present invention, transport encoder 355 operates with controller 315 to transmit pre-encoded data that does not require the use of bit rate shaping or quantization levels, as described above. In response to network conditions, as reported to the controller 315 through communications interface 305, transport encoder 355 accesses pre-encoded data in storage device 390 whereby the amount of data encoded for transport is dependent upon network conditions. Because data has already been pre-encoded, preferably in an MPEG compatible format, transport encoder 355 can drop data in accordance with instructions received from controller 315.

Specifically, transport encoder 355 makes use of the different levels or layers of pre-encoded data known as scalable encoding for transmitting pre-encoded data. The higher priority layers of the pre-encoded data represent data that is necessary to render video and/or audio at a receiver. Conversely, the lower layers of pre-encoded data represent data that are less important for the presentation of video and/or audio. The neural network in controller 315 indicates to transport encoder 355 what level of data should be transmitted.

As known in the art, scalable encoding includes a base layer (high priority layers) and one or multiple enhancement layer (lower priority layers). The base layer must be transmitted all the time and is usually encoded in a way to fit the minimum channel bandwidth. The enhancement layer(s) can be transmitted as network condition allows. There are a number of techniques to implement scalable coding including SNR and temporal scalable coding. More recently, MPEG-4 has adopted object scalability where important objects are placed at a higher layer Transport encoder 355, upon encoding the data for transport transmits the encoded data to encode PID selection 345, encoder 330, and communication interface 305 in accordance with the process described.

It is to be appreciated that the described invention may be applied to other communication networks that transmit encoded packetized information over a communications network. Some networks transport or control protocols that utilize robust reporting systems. Additionally, it is possible that a control or transport protocol may be used without the ability to receive reporting information back from devices on a network. In this case, the system may use parameters such as that status of internal buffers (overflow or underflow states) to determine parameters for the neural network to control network flow.

The invention claimed is:

1. A method of transmitting a signal encompassing an encoded media object comprising the steps of: encoding video information of said media object into said signal for transmission over a communications network;
   receiving network communication parameters related to the status of said communications network;
   adapting, responsive to said step of receiving network communication parameters, said encoding step using a neural network, wherein said adapting step comprises the operations of modifying a quantization level used to quantize said video information after a transform operation and: bit rate shaping by adjusting the bit rate used for encoding said quantized video information.

2. The method of claim 1, wherein said network communication parameters are: A. packet fraction loss; B. cumulative number of packets lost; C. inter-arrival jitter; and D. last sender report:

3. The method of claim 2, wherein said communication parameters are received as Real Time Control Protocol system status information.

4. The method of claim 1, wherein said signal is encoded into an MPEG compatible data stream.

* * * * *